United States Patent [19]

Beekenkamp

[11] 4,314,782

[45] Feb. 9, 1982

[54] TOOL GUIDE

[75] Inventor: Gerald Beekenkamp, Mississanga, Canada

[73] Assignee: Black & Decker Inc., Newark, Del.

[21] Appl. No.: 63,845

[22] Filed: Aug. 6, 1979

[51] Int. Cl.³ .......................... B23B 45/14; B23B 49/00

[52] U.S. Cl. .......................... 408/16; 408/110; 408/712; 408/88

[58] Field of Search .......................... 408/14, 16, 76, 110, 408/100, 112, 115, 116, 712, 88

[56] References Cited

U.S. PATENT DOCUMENTS

| | | | |
|---|---|---|---|
| 2,888,965 | 6/1959 | Phillips | 408/712 X |
| 2,953,045 | 9/1960 | Carles . | |
| 3,046,817 | 7/1962 | Schwable | 408/110 |
| 3,107,556 | 10/1963 | Pugsley . | |
| 3,119,286 | 1/1964 | Forman et al. . | |
| 3,242,773 | 3/1966 | Van Praag . | |
| 3,250,153 | 5/1966 | Purkey . | |
| 3,273,424 | 9/1966 | Hughes | 408/88 X |
| 3,827,822 | 8/1974 | Converse . | |
| 3,874,810 | 4/1975 | Russell | 408/14 |
| 4,080,092 | 3/1978 | Hudson | 408/110 |
| 4,227,839 | 10/1980 | Conway | 408/16 |

*Primary Examiner*—Z. R. Bilinsky

*Attorney, Agent, or Firm*—Harold Weinstein; Edward D. Murphy; Walter Ottesen

[57] ABSTRACT

A tool guide for providing controlled support for a portable power tool such as an electric drill. When the lower portion of the device is clamped between the vise jaws of a portable workbench and vise, an electric drill slidably mounted on the device may be used to drill either perpendicular or angular holes in a workpiece positioned on top of the vise jaws. The device may also be used independently to add accuracy to free hand drilling for both perpendicular and angular holes.

9 Claims, 11 Drawing Figures

FIG. 3.
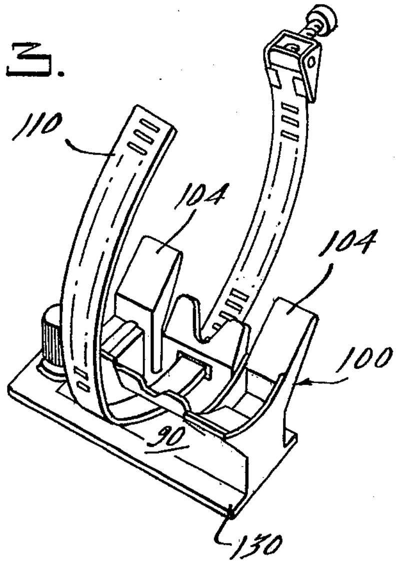
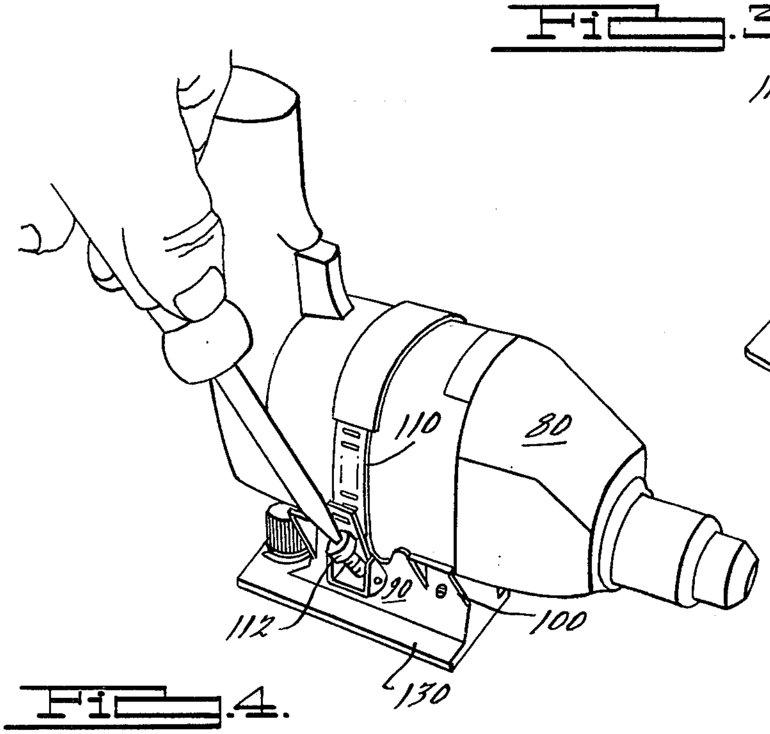
FIG. 4.
FIG. 5.
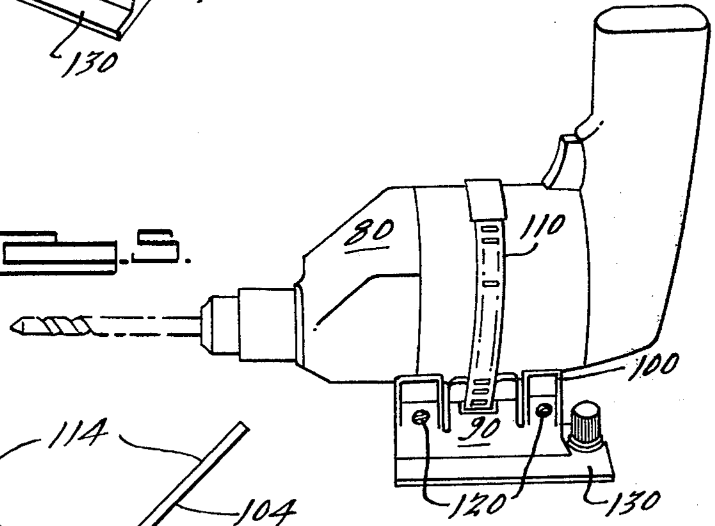
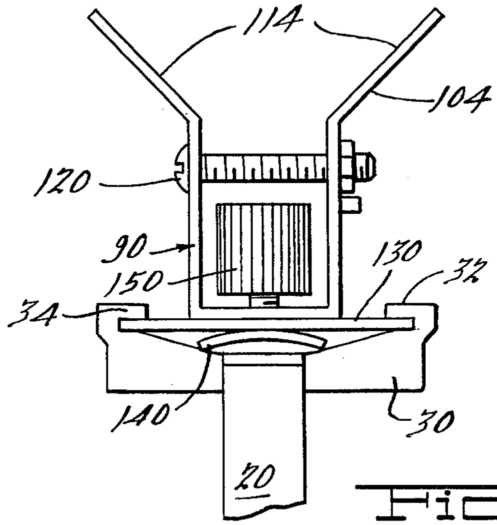
FIG. 6.

TOOL GUIDE

BACKGROUND AND SUMMARY OF THE INVENTION

The present invention pertains primarily to tool holding or tool guiding devices, and more particularly to alignment devices for electric power tools such as electric drills or the like.

Tool guides of the general type to which the present invention pertains are known in the art and embody a variety of design approaches. However, most known prior art designs are intended to be utilized as stand-alone structures for providing complete support for the drill or other portable tool secured thereto. The principle disadvantage with this approach is that it typically requires a substantial base structure to support the tool which adds to the weight of the tool guide making it cumbersome to use as a freehand support. As an additional consequence, such tool guides are not readily adaptable for use in combination with the portable workbench and vise structures which have become increasingly popular with home hobbyists.

Accordingly, it is the principle object of the present invention to provide an improved portable tool guide that does not require a base structure and therefore is lightweight and particularly adapted for use as a freehand support or in combination with a portable workbench and vise.

In general, the tool guide according to the present invention comprises a generally U-shaped body with one leg thereof integrally defining an elongated slideway having slideably engaged therewith a tool holder for securing a drill or the like to the tool guide. The transverse portion of the body extends beyond the slideway in the longitudinal direction and defines a clamping support adapted to be inserted between vise jaws or the like for providing a rigid support for the tool guide. In this respect, the particular adaptability of the present invention for use in combination with a portable workbench and vise can be readily appreciated. In addition, the transverse portion as well as the remaining leg portion of the body preferably have a reduced thickness relative to the slideway so that the bottom of the slideway will abut the work surface of the workbench when the transverse body portion is clamped between the vise jaws of the bench. The rearward point of the slideway together with the protractor markings provided along the remaining leg portion of the body thus serve as a convenient means for accurately adjusting the angle at which the slideway is set relative to the work surface when the tool guide is clamped to the workbench.

The leg portion of the body spaced apart from the slideway also has an arm that is extendible from and retractible into the leg portion of the body. When using the tool guide in the free-hand manner, the forward or free-end of the slideway together with the exposed end of the arm define a two point support for resting the tool guide against a work surface. By adjusting the distance the arm extends from the body, the angle of the slideway relative to the work surface can be adjusted anywhere between 45° and 90°.

Additional advantages and features of the present invention will become apparent from a reading of the detailed description of the preferred embodiment which makes reference to the following set of drawings in which:

BRIEF DESCRIPTION OF THE DRAWINGS

FIG. 3 is a perspective view of the tool holder portion of the tool guide of the present invention;

FIGS. 4 and 5 are perspective views illustrating an electric drill mounted in the tool holder of FIG. 3;

FIG. 6 is an end view of the tool holder of the tool guide illustrated in FIG. 1;

DETAILED DESCRIPTION OF THE PREFERRED EMBODIMENT

Figure 1:
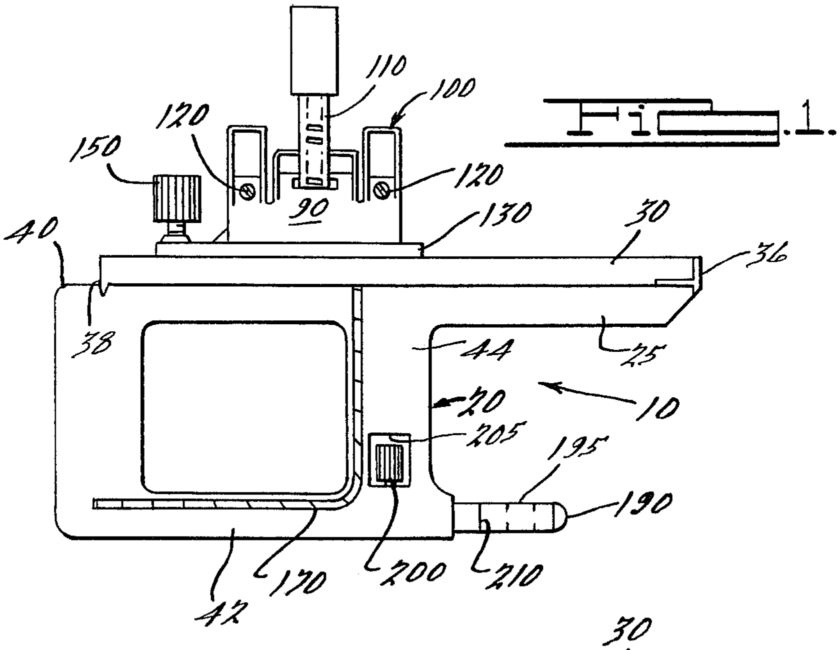
FIG. 1 is a front elevational view of the tool guide of the present invention.
Figure 8:
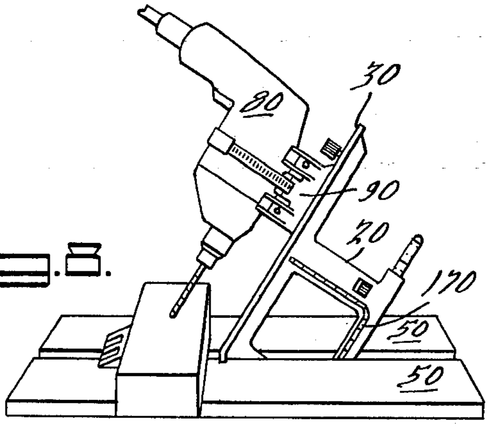
FIG. 8 is a perspective view of the tool guide of the present invention clamped between vise jaws in use to guide an electric drill in making an angular hole.

Referring to FIG. 1, a tool guide 10 according to the present invention is shown. The tool guide 10 comprises a substantially U-shaped body 20 defining a first leg portion 25 having integrally associated therewith a slideway 30 which extends substantially the entire length of the body 20. As best shown in FIG. 6, the slideway 30 has a pair of inwardly extending flanges 32 and 34 formed along its entire length which are adapted to receive for sliding engagement therewith a tool holder 90. The transverse end portion 40 of the body 20 extends beyond the slideway 30 in the longitudinal direction so as to provide a clamping surface for securing the tool guide 10 to a portable workbench and vise structure 60 of the general type illustrated in FIG. 2. In addition, the width of the slideway 30 is substantially greater than the uniform thickness of the remainder of the body 20 including the transverse end portion 40. The purpose for this is to permit the tool guide 10 to be secured between the vise jaws 50 of a portable workbench 60 in various canted positions (as illustrated for example in FIG. 8) so that the slideway 30 can be set to any angle between 0° and 90° relative to the work surface of the workbench 60.

To assist the operator in securing the tool guide to a workbench 60 at a desired angle, the second leg portion 42 as well as the intermediate transverse portion 44 of the body 20 have angular markings 170 provided thereon which are referenced to the rearward point 38 of the slideway 30 to provide a two-point reference system for positioning the tool guide 10 in the vise 50. More particularly, to set the angle of the slideway 30 at a desired angle between 0° and 90° relative to the work surface, the transverse end portion 40 of the body 20 is inserted into the vise 50 until the end 38 of the slideway 30 abuts the work surface, and then the body 20 of the tool guide 10 is rotated until the desired angular marking 170 is aligned with the work surface. The vise 50 is then closed to lock the tool guide 10 in place.

Returning to FIG. 1, the second leg portion 42 of the body 20 contains an arm 195 which is extendible from leg portion 42 in a direction substantially parallel to slideway 30. Once extended the postion of the arm 195 is locked by tightening a knurled knob 200 which is fastened to a threaded shaft that frictionally engages the edge of arm 195. It will be noted that locking knob 200 is preferably disposed in an opening 205 formed in transverse member 44 so that the knob 200 does not extend beyond either clamping surface of the body 20. In this manner, locking knob 200 will not contact the vise jaws 50 when the portion of the body 20 adjacent the opening 205 is secured in the vise of a portable workbench 60.

Figure 9:
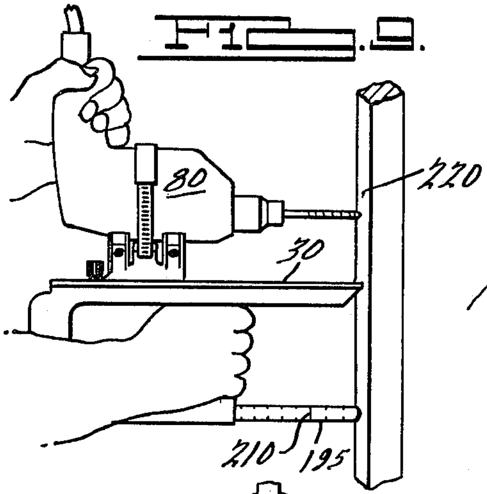
FIG. 9 is a perspective view of the tool guide of the present invention in free-hand use to guide an electric drill in making a perpendicular hole.
Figure 10:
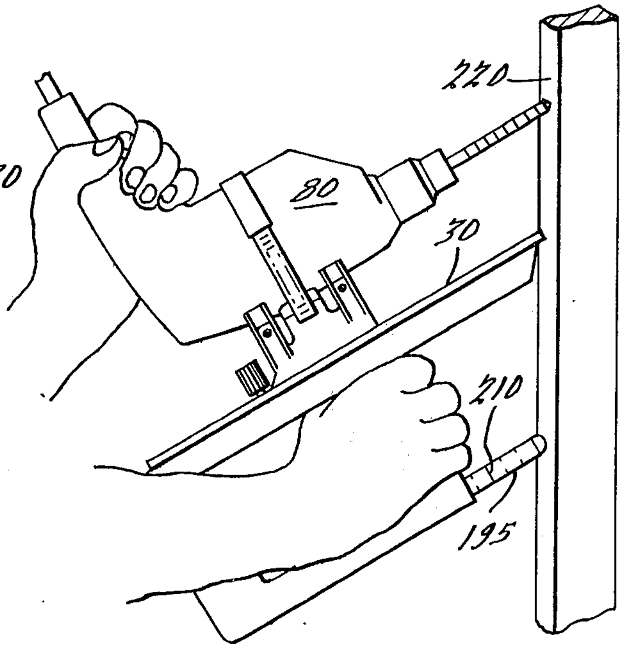
FIG. 10 is a perspective view of the tool guide of the present invention in free-hand use to guide an electric drill in making an angular hole.

The purpose of the adjustable arm 195 is to provide a point of support for the tool guide 10 when it is used in the free-hand manner. In particular, the tip 190 of arm 195 together with the free-end 36 of slideway 30 define a two-point support for resting the tool guide 10 against a work surface 220 as illustrated in FIGS. 9 and 10. By adjusting the distance arm 195 protrudes from the body 20 of the tool guide 10, it will be appreciated that the angle of slideway 30 relative to the work surface 220 can be varied accordingly. Degree markings 210 from 45° to 90° are provided on arm 195 to assist the user in accurately setting the desired angular position of the tool guide 10. In addition, it will be noted that the intermediate transverse portion 44 serves as a convenient hand grasp for holding the tool guide 10 when it is used in the free-hand manner illustrated in FIGS. 9 and 10.

Referring now to FIGS. 1 and 3–6, a tool such as a portable power drill 80, is secured to the tool guide 10 by means of a tool holder 90 which is slidably engaged in slideway 30. Tool holder 90 comprises a base portion 130 that engages with slideway 30 and a saddle portion 100 adapted to support the body of the drill 80. Saddle portion 100 comprises a pair of "Y" support members 104 that are particularly adapted for providing a rigid support for a tool having a substantially circular body, such as a drill. However, it is to be understood that a differently configured saddle portion could be substituted for supporting a special type of tool. The drill 80 is secured to the saddle portion 100 of tool holder 90 by means of an adjustable band that is adapted to be wrapped around the body of the drill 80 and tightened by turning screw 112 in the manner shown in FIG. 4. Once secured to tool holder 90, the orientation of the drill 80 can be accurately adjusted so that the drill bit is parallel with the slideway 30. As best illustrated in FIG. 6, this is accomplished by adjusting the leveling screws 120 so that the distance between the supporting surfaces 114 of each "Y" support member 104 is either contracted or expanded to thereby raise or lower the forward or rearward end of the drill 80 as is appropriate.

Figure 7:
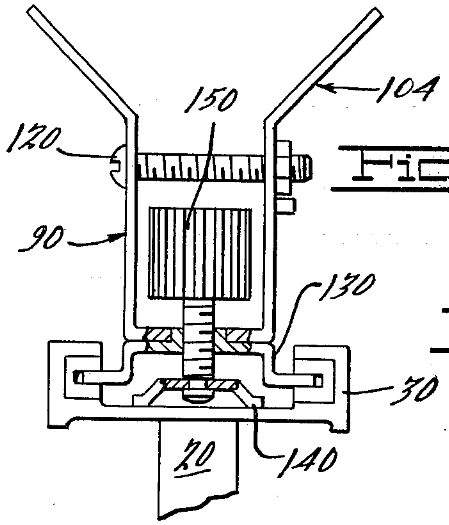
FIG. 7 is a view similar to FIG. 6 illustrating an alternative tool holder construction.
Figure 11:
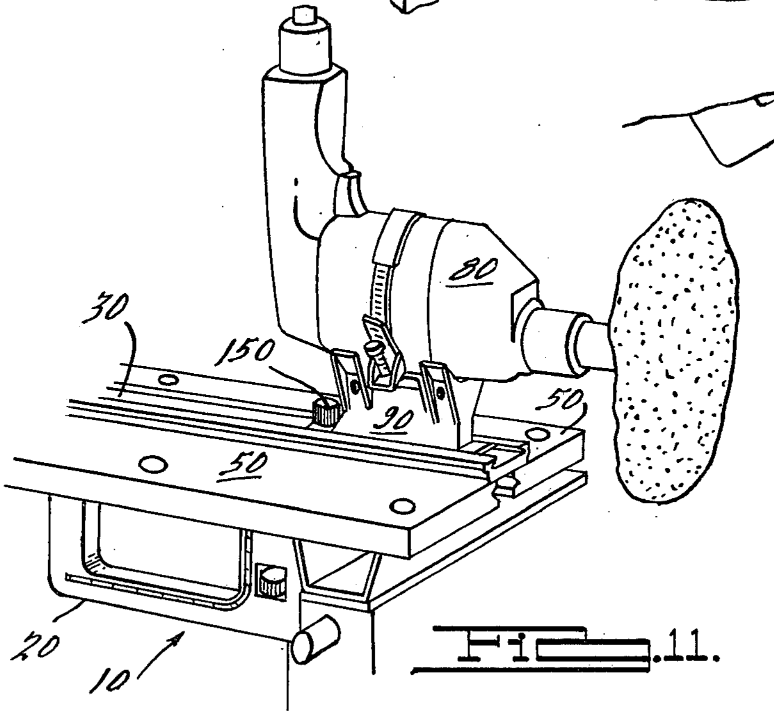
FIG. 11 is a perspective view of the tool guide of the present invention clamped between vise jaws in use to hold an electric drill for stationary use.

Since it is desirable in certain applications to maintain the position of the tool stationary, such as when using a drill as a grinder or a buffing wheel as illustrated in FIG. 11, the tool holder 90 preferably includes means for fixedly securing the position of the tool holder 90 relative to the slideway 30. This may for example take the form of a pressure pad 140, as configured in either FIGS. 6 or 7, that is forced into frictional engagement with the inner surface of slideway 30 by means of an adjustable locking element, such as a knurled knob 150 which is fastened to a shaft threadedly engaged to and extending through the base 130 of tool holder 90.

Figure 2:
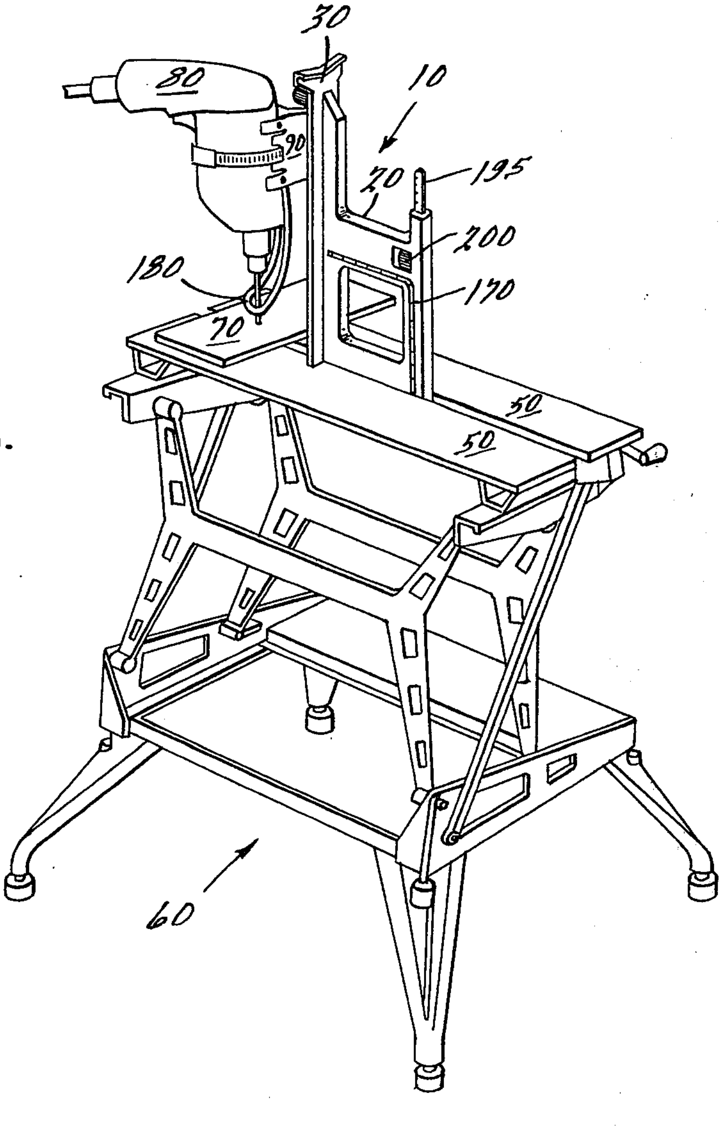
FIG. 2 is a perspective view of the tool guide of the present invention in use in combination with a portable workbench and vise.

With particular reference to FIG. 2, the tool holder 90 of the preferred embodiment also includes a drill depth stop, which herein is shown to comprise a rigid wire loop 180 that extends around the drill bit and is adapted to abut the surface of the workpiece 70 after the drill bit has penetrated a preset depth into the workpiece 70.

Thus, it will be appreciated from the above description that the tool guide of the present invention comprises an exceptionally versatile device capable of very accurate work. Moreover, when fabricated using plastic or the like as is preferred, the present portable tool guide is lightweight and, due to the relative simplicity of the design, inexpensive to manufacture.

While the above description constitutes the preferred embodiment of the present invention, it will be appreciated that the invention is susceptible to modification, variation and change without departing from the proper scope or fair meaning of the accompanying claims.

What is claimed is:

1. A tool guide system comprising:

a workbench;

a vise connected to said workbench;

said workbench having a worksurface lying in a first plane;

a tool guide including a substantially U-shaped body having first and second leg portions and a transverse portion connecting said two leg portions;

said transverse portion and said leg portions lying in a second plane;

said first leg portion having an outer longitudinal edge;

a longitudinal slideway of predetermined width connected along said outer longitudinal edge of said first leg portion;

said transverse portion extending beyond said slideway in the longitudinal direction;

said second leg portion and said transverse portion having a substantially uniform thickness less than the width of said slideway;

at least a part of said transverse portion being clamped in said vise below said first plane with said slideway disposed above and at a predetermined angle relative to said first plane;

said predetermined angle being in the range of from 0° through 90°; and a tool holder slidably engaged with said slideway for securing a portable power tool to said tool guide.

2. A tool guide for provinding a free-hand stationary support for a portable power tool comprising:

a body having two substantially parallel leg portions and a transverse portion connecting said two leg portions, one of said leg portions having integrally associated therewith a longitudinal slideway extending a predetermined distance beyond the other leg portion, said other leg portion having an extendible arm associated therewith, the end of said arm together with the corresponding end of said slideway comprising a two-point support for resting said tool guide against a work surface, such that the angular position of said slideway relative to the work surface is determined by the distance said arm is extended from said other leg portion; and a tool holder slidably engaged with said slideway for securing a portable power tool to said tool guide.

3. The tool guide of claim 2 wherein said arm is extendible from and retractible into said other leg portion.

4. The tool guide of claim 3 wherein said arm has angle markings thereon which are adapted to be aligned with the end of said other leg portion for assisting the user in extending said arm the appropriate distance from said other leg portion to provide the desired angular support for said slideway.

5. A tool guide for providing a rigid support for a portable power tool comprising:

a substantially U-shaped body defining substantially parallel first and second leg portions and a transverse portion connecting said two leg portions and having a longitudinal slideway integrally associated with said first leg portion, said slideway extending a predetermined distance beyond said second leg portion in one longitudinal direction, said transverse portion extending beyond said slideway in the opposite longitudinal direction, said transverse portion and said second leg portion having a substantially uniform thickness less than the corresponding dimension of said slideway, and said second leg portion having angular markings thereon which are referenced to the end of said slideway adjacent said transverse portion;

an arm extendible from said second leg portion said predetermined distance and retractible into said second leg portion; and a tool holder slidably engaged with said slideway for securing a portable power tool to said tool guide.

6. A tool guide adaptable for use in combination with a portable workbench and vise for supporting a portable power tool comprising:

a body comprising a first portion having integrally associated therewith a longitudinal slideway, a second portion extending beyond said slideway in the longitudinal direction for rigidly supporting the tool guide with said slideway above the work surface of a workbench when said second portion is clamped in the vise of the workbench, and a third portion;

said second portion having a reduced thickness relative to the corresponding dimension of said slideway so that the end of said slideway will abut the top of the vise when said second portion is clamped in the vise;

said third portion having angular markings thereon referenced to said end of said slideway and alignable with the top of the vise for assisting in the angular positioning of said slideway relative to the work surface of the wrokbench; and a tool holder slidably engaged with said slideway for securing a portable power tool to said tool guide.

7. A tool guide adaptable for use in combination with a portable workbench and vise for supporting a portable power tool comprising:

a substantially U-shaped body having first and second leg portions and a transverse portion connecting said two leg portions;

a longitudinal slideway of predetermined width integrally formed on said first leg portion;

said transverse portion extending beyond said slideway in the longitudinal direction;

said second leg portion and said transverse portion having a substantially uniform thickness less than the width of said slideway for permitting said transverse portion to be inserted into the vise of a workbench until the adjacent end of said slideway abuts the top of said vise, and to be clamped in said vise with said slideway disposed above and at a predetermined angular orientation relative to the work surface of said workbench;

said second leg portion having angular markings thereon which are referenced to said adjacent end of said slideway for assisting in the angular positioning of said slideway relative to the work surface of said workbench; and a tool holder slidably engaged with said slideway for securing a portable power tool to said tool guide.

8. A tool guide adaptable for use in combination with a portable workbench and vise for supporting a portable power tool comprising:

a substantially U-shaped body having first and second leg portions and a transverse portion connecting said two leg portions;

a longitudinal slideway of predetermined width integrally formed on said first leg portion;

said slideway being substantially parallel to and extending a predetermined distance beyond said second leg portion;

said transverse portion extending beyond said slideway in the longitudinal direction;

said second leg portion having an arm extendible and retractible into said second leg portion, with the end of said arm together with the corresponding end of said slideway comprising a two-point support for resting said tool guide against a work surface when the tool guide is used in a free-hand manner, such that the angular position of said slideway relative to the work surface is determined by the distance said arm is extended from said second leg portion;

said second leg portion and said transverse portion having a substantially uniform thickness less than the width of said slideway for permitting said transverse portion to be clamped in the vise of a workbench with said slideway disposed above and at a predetermined angular orientation relative to the work surface of the workbench; and a tool holder slidably engaged with said slideway for securing a portable power tool to said tool guide.

9. The tool guide of claim 8 further including a second transverse portion located approximately midway along said slideway for providing a hand grasp when the tool guide is used in the free-hand manner.

* * * * *